Dec. 20, 1960 P. E. BESSIERE 2,965,037
RECIPROCATING ACTION PUMPS AND IN PARTICULAR IN FUEL
INJECTION PUMPS FOR INTERNAL COMBUSTION ENGINES
Filed Nov. 12, 1957 6 Sheets-Sheet 1

INVENTOR
Pierre Etienne Bessiere
BY
Bailey, Stephens & Huettig
ATTORNEYS

Dec. 20, 1960 P. E. BESSIERE 2,965,037
RECIPROCATING ACTION PUMPS AND IN PARTICULAR IN FUEL
INJECTION PUMPS FOR INTERNAL COMBUSTION ENGINES
Filed Nov. 12, 1957 6 Sheets-Sheet 4

INVENTOR
Pierre Etienne Bessiere
BY
Bailey, Stephens + Huettig
ATTORNEYS

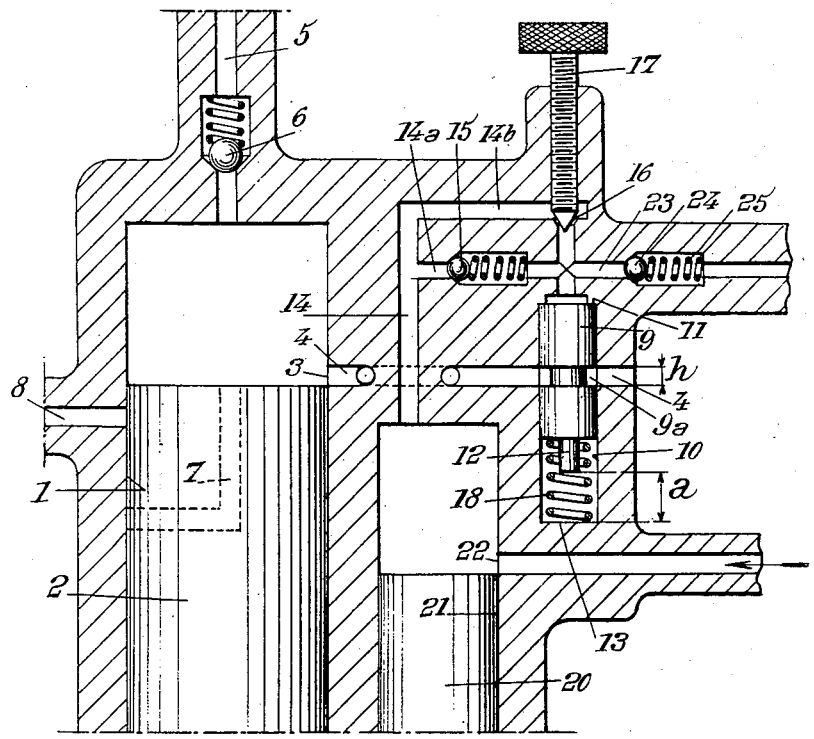

Dec. 20, 1960  P. E. BESSIERE  2,965,037
RECIPROCATING ACTION PUMPS AND IN PARTICULAR IN FUEL
INJECTION PUMPS FOR INTERNAL COMBUSTION ENGINES
Filed Nov. 12, 1957  6 Sheets-Sheet 6
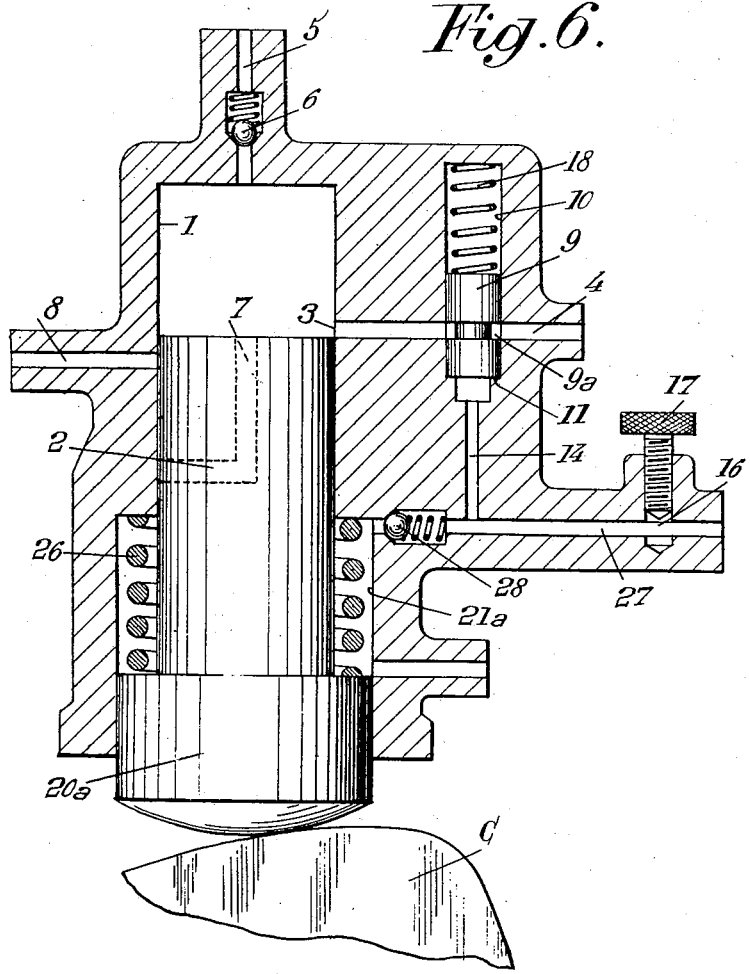
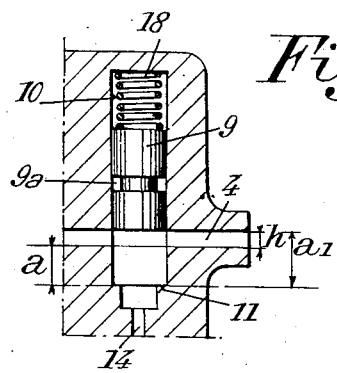
INVENTOR
Pierre Etienne Bessiere
BY
Bailey, Stephens & Huettig
ATTORNEYS

United States Patent Office 2,965,037
Patented Dec. 20, 1960

2,965,037

RECIPROCATING ACTION PUMPS AND IN PARTICULAR IN FUEL INJECTION PUMPS FOR INTERNAL COMBUSTION ENGINES

Pierre Etienne Bessiere, 55 Boulevard Commandant Charcot, Neuilly-sur-Seine, France Filed Nov. 12, 1957, Ser. No. 695,587

Claims priority, application France Nov. 20, 1956

15 Claims. (Cl. 103—41)

The present invention relates to reciprocating action pumps and it is more especially but not exclusively concerned with fuel injection pumps for internal combustion engines.

My invention relates to pumps of this type in which a reciprocable member, intended to ensure self-regulation of pump output, is moved in one direction by the action of a liquid undergoing pressure variations produced in given time relation with those of the liquid delivered by the pump, against the action of resilient antagonistic means, whereas movement of said member in the opposed direction under the action of said return means is braked by throttling means provided in a passage through which flows the liquid driven back by said member during said movement in the opposed direction, whereby a so-called "liquid abutment" causing a reduction of the amplitude of movement of said member is formed as soon as the speed at which the pump is operated exceeds a given value.

Such pumps are already described in my U.S. patent application Ser. No. 673,343, filed July 22, 1957, for "Improvements in Reciprocating Liquid Pumps, and in Particular in Fuel Injection Pumps."

I have further suggested to give said movable member the form of a slide valve which opens and closes a conduit through which flows the liquid delivered by the pump toward the outside thereof. Such a control slide valve was in particular described in my U.S. patent application Ser. No. 684,236, filed on September 16, 1957, for "Improvements in Self-Regulating Reciprocating Pumps, and in Particular in Fuel Injection Pumps for Internal Combustion Engines." According to this last mentioned patent application, the slide valve, during the strokes thereof which close said conduit, is moved beyond the position which just ensures this closing, the supplementary stroke thus produced and the braking to which the slide valve is subjected during its return movement being such that the conduit remains constantly closed by the slide valve as soon as the speed of the pump exceeds a predetermined maximum value.

The present invention consists essentially in using a reciprocable member, and in particular a slide valve, as above mentioned to control not the conduit through which the liquid delivered by the pump flows to the outside thereof but the conduit through which the pump cylinder is fed with the liquid to be delivered.

Preferred embodiments of my invention will be hereinafter described with reference to the accompanying drawings, given merely by way of example and in which:

Figs. 2, 3, 4, 5 and 6 are similar views of other embodiments of my invention, respectively.

Fig. 7 shows a particular position of the reciprocable control member of the pump of Fig. 6.

Figure 1:
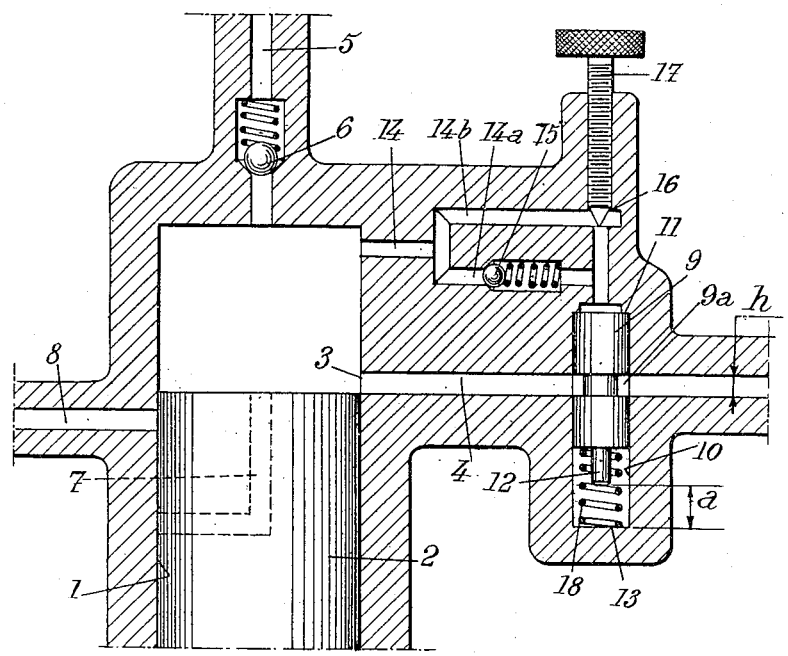
Fig. 1 is a diagrammatic axial sectional view of a pump made according to an embodiment of my invention.

The pump according to my invention includes a cylinder 1 cooperating with a piston 2 driven in any suitable manner, for instance by means of a cam (such as shown at C on Fig. 6). This piston 2 controls a port 3 through which a feed conduit 4 opens into cylinder 1. Furthermore, the top of cylinder 1 communicates with a delivery conduit 5 advantageously provided with a check-valve 6, this conduit 5 conveying the fuel delivered by the pump toward the injector or injectors of the engine on which the pump is mounted. In order to obtain a sudden stopping of injection, I provide in piston 2 a channel 7 one of the ends of which opens into the top end face of the piston, whereas its other end opens into the side surface of said piston, this last mentioned end being disposed in such manner that it comes into register with a discharge conduit 8 when piston 2 is at the top of its inward stroke, whereby the variable volume chamber of the pump is then placed in communication with said discharge conduit 8. Delivery conduit 8 is closed when the piston is at the bottom of its downward stroke (position shown by Figs. 1 to 6). On the contrary, for this position of the piston, the outlet 3 of feed conduit 4 is cleared by piston 2.

According to the main feature of my invention, feed conduit 4 is controlled not only by piston 2 by also by a member, preferably in the form of a slide valve 9, reciprocable inside a cylindrical housing 10 between two end positions. One of these positions (that shown by the drawings) is fixed by a shoulder 11 against which slide valve 9 may be applied, whereas the other of said positions is fixed by an abutment, for instance (Figs. 1 to 5) by an extension 12 of slide valve 9 coming into contact with the bottom 13 of cylindrical housing 10. Slide valve 9 is provided with a transverse channel or groove 9a positioned in such manner as to clear feed conduit 4 when slide valve 9 is in contact with shoulder 11. On the contrary, channel 4 is closed when the abutment 12 of slide valve 9 is applied against the bottom 13 of cylinder 10. The displacement $a$ (Figs. 1 to 5) or $a_1$ (Fig. 7) of slide valve 9 when it moves from the first mentioned of these two positions to the second one is greater than the height $h$ of conduit 4 so that said slide valve, when it is in the second mentioned position, has moved a distance equal to the difference $a-h$ (or $a_1-h$) beyond the position for which it just closes conduit 4.

The movement of slide valve 9 from the position in which it opens conduit 4 toward the position in which it closes this conduit and beyond this position is (in the embodiments of Figs. 1 to 4) caused by the pressure produced in cylinder 1 as soon as piston 2 starts on its upward stroke. For this purpose, in the construction of Fig. 1, the upper end of the variable volume chamber of cylinder 1 is constantly connected, through a conduit 14 divided into two branches 14a and 14b, with the upper end of cylindrical housing 10. The branch 14a of this conduit includes a check-valve 15, for instance in the form of a ball, whereas the other branch 14b contains a throttling member 16, which is preferably adjustable by means of a screw 17.

The movement of slide valve 9 in the opposed direction, that is to say from the position in which its abutment 12 is in contact with the bottom end wall 13 of cylinder 10 toward the position where said slide valve 9 is applied against shoulder 11, is ensured by spring 18.

The operation of the device of Fig. 1 is as follows:

When piston 2, starting from its lowermost position, closes port 3, the liquid present in cylinder 1 above piston 2 and also that present in conduit 14 are compressed and check-valve 15, the spring of which is preferably of a strength lower than that of check-valve 6 and anyway corresponds to a pressure lower than that of the injector (not shown), is driven away from its seat. The liquid driven by piston 2 therefore pushes slide valve 9 into its lowermost position for which conduit 4 is closed. Subsequent movement of piston 2 in the upward direction causes fuel to be delivered through conduit 5 toward the injector. This delivery takes place until channel 7 connects the inside of cylinder 1 with discharge conduit 8.

At this time, the pressure in cylinder 1 and in conduit 14 drops suddenly and spring 18 pushes slide valve 9 toward the position for which said slide valve opens feed conduit 4. Check-valve 15 which had already been closed as soon as abutment 12 had reached bottom wall 13 (since liquid was no longer flowing through branch 14a) now prevents the back flow of liquid from housing 10 toward cylinder 1 through conduit 14a, whereby this liquid must flow through conduit 14b which contains the throttled portion 16, so that the return movement of the slide valve is braked.

As long as the engine runs at a relatively low speed and consequently the movements of piston 2 are relatively slow, the time taken by piston 2 to move back from its upper position toward the position where it starts opening feed port 3 is greater than, or at least equal to, the time requested by slide valve 9 to open conduit 4 completely. Therefore the slide valve does not reduce the feed of liquid to the pump. If the speed of the engine and consequently that of piston 2 increase, piston 2 begins to open port 3 at a time where slide valve 9 has not still wholly cleared conduit 4. The slide valve therefore produces a reduction of the feed of liquid to the pump. When the speed of the engine further increases, there comes a time when slide valve 9 has not yet finished its upward stroke and has only partly opened conduit 4 when piston 2 resumes its upward movement in cylinder 1 and starts on its next delivery stroke. Slide valve 9 is thus stopped by the liquid abutment which is formed on its upper face and it is subsequently pushed back toward the bottom 13 of its cylindrical housing 10. If, finally, the speed of the engine increases to such a value that slide valve 9 is not yet beginning to open conduit 4 at the time piston 2 is resuming its upward movement, there is no feed at all and the delivery of the pump toward the injectors ceases. In other words, the output of the pump is stopped when the speed of the engine becomes such that the time corresponding to the downward movement of piston 2, and possibly to its standing still in its lowermost position, is shorter than the time necessary for slide valve 9 to move through distance $a-h$. The speed of the engine for which the pump ceases to deliver fuel corresponds to the maximum speed of the engine.

It should further be noted that the self-regulating action of the pump is still more efficient if the pump which feeds fuel through conduit 4 toward pump 1—2 is a pump the pressure of which is constant whatever be the speed of the engine or the pressure of which decreases when the speed of the engine increases. In this case, the reduction of the output of the pump for increasing speeds of the engine is produced by the combined effects of the reduction of the free section of flow through conduit 4, as produced by slide valve 9, and of the reduction of time for which piston 2 clears port 3.

Figure 2:
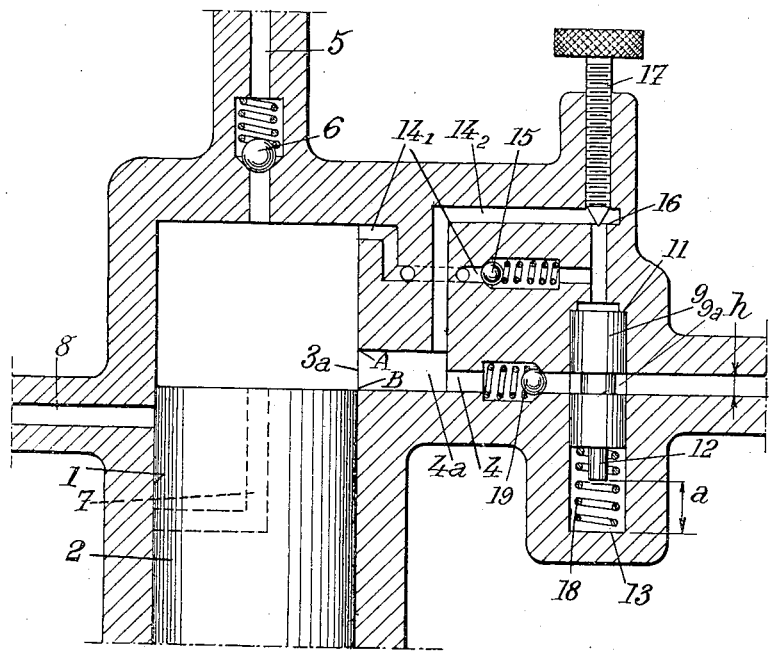

The device shown by Fig. 2 differs from that of Fig. 1 chiefly in that the conduit branch $14_2$ which contains throttling member 16 is controlled by the piston 2 of the pump and, preferably, is alternately closed and cleared by this piston in the same manner as port 3a through which feed conduit 4 opens into cylinder 1. Preferably, channel $14_2$, instead of communicating directly with cylinder 1, opens into the conduit portion 4a through which conduit 4 is in communication with cylinder 1. Advantageously, port 3a is given a height A—B greater than the height of conduit 4. Preferably, I interpose, between conduit portion 4a and slide valve 9, a check-valve 19 opening in the direction from slide valve 9 toward cylinder 1.

As for conduit $14_1$, in which check-valve 15 is placed and through which flows the fuel which pushes slide valve 9 toward its closing position, it is quite separate from conduit $14_2$ and is directly connected with cylinder 1, preferably at a place where it is never closed by piston 2.

The differences existing between the two devices shown by Figs. 1 and 2 respectively correspond to an important difference of operation. As a matter of fact, in the device shown by Fig. 2, slide valve 9 can start on its upward movement to clear conduit 4 only when piston 2 starts opening port 3a. However, the feed of cylinder 1 through conduit 4 cannot begin immediately at this time because, the upward movement of slide valve 9 being slowed down by throttling means 16 and due to the fact that distance $a$ is greater than the height $h$ of the conduit, slide valve 9 must first move a distance equal to the difference $a-h$ before it begins opening conduit 4. Cylinder 1 can be fed with liquid only between the time slide valve 9 starts opening conduit 4 and the time said slide valve starts back on its downward movement so as to close conduit 4 under the effect of a new increase of the pressure of fuel, which increase takes place when piston 2 starts moving back upwardly from its lowermost position B. When piston 2, during its upward stroke, comes back to the level of point A, the abutment 12 of the slide valve is already once more applied against the bottom 13 of cylinder housing 10 and the delivery of fuel through delivery conduit 5 has practically already begun. Delivery through conduit 5 ceases when cylinder 1 is placed in communication with discharge conduit 8 through channel 7. After this, piston 2 moves down and when it begins to clear port 3a the cycle begins again.

It results from the preceding description that the upward movement, that is to say the opening movement, of slide valve 9 must take place wholly while piston 2 is moving down from A to B and possibly is remaining for a time at B. The upward movement of the slide valve includes two portions: one during which conduit 4 remains closed, the distance travelled over by slide valve 9 during this portion of its movement being equal to $a-h$, and a second portion during which slide valve 9 opens conduit 4 more or less completely. If piston 2 starts moving back in the upward direction from B before slide valve 9 has reached the end of its upward stroke, there is formed above slide valve 9 a liquid abutment which immediately stops upward movement of the slide valve. Subsequently, the fuel delivered by piston 2 pushes slide valve 9 back toward its lowermost position, in which said slide valve closes conduit 4. As already stated, the end of the feed takes place even before port 3a has been closed.

If I designate by T the time taken by slide valve 9 to move through distance $a-h$ and by $T_1$ the time taken by piston 2 to travel downwardly from A to B and to resume its upward movement, fuel is fed to cylinder 1 during a time equal to $T_1-T$. When the speed of the engine varies, $T_1$ varies proportionally to this speed. If I start from working conditions where T is equal to $0.9\ T_1$, the time during which cylinder 1 is fed with liquid will be $T_1 - 0.9\ T_1$, that is to say $\frac{1}{10}\ T_1$. If the speed of the engine increases so that $T_1$ decreases by $\frac{1}{10}$, the feed of fuel to cylinder 1 will be stopped. If, on the contrary, the speed of the engine decreases so that $T_1$ increases by $\frac{1}{10}$, the feed will be doubled. I thus obtain a regulation with limit speeds which may be modified by adjusting the throttling means 16 by means of screw 17.

Instead of increasing the height of port 3a, I may cause conduit 4 to open into cylinder 1 at a place located above the level of the top end face of piston 2 in its lower dead center position. The time interval $T_1$ then extends from the time when the piston, during its downward stroke, starts opening port 3a to the time where it starts back on its next upward stroke.

Figure 3:
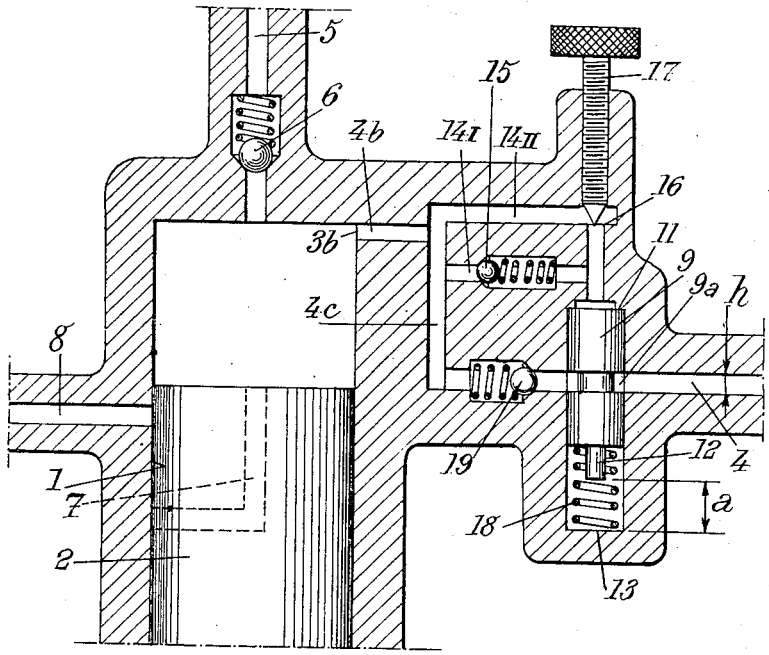
Figure 4:
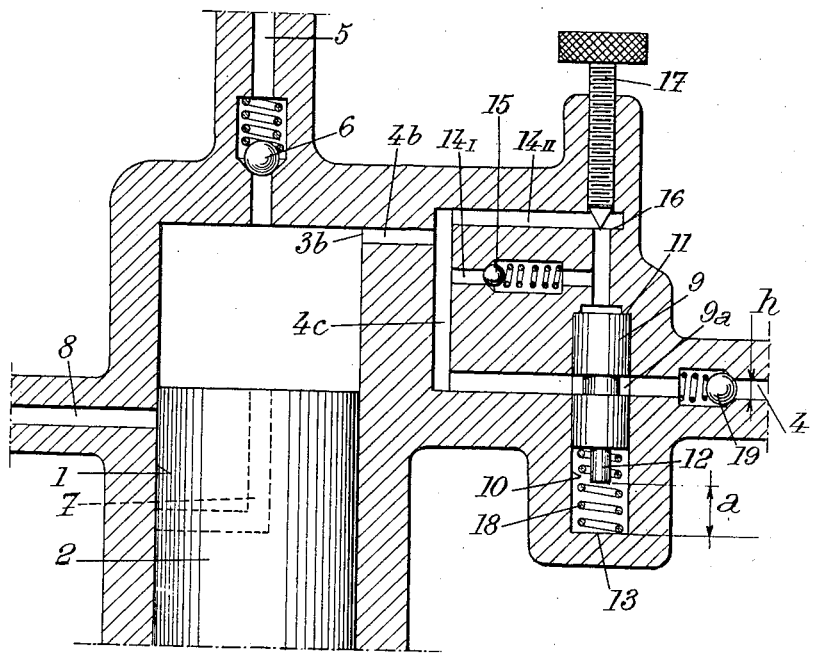

Instead of having feed conduit 4 controlled by the piston 2 of the pump, I may have this feed conduit controlled by only slide valve 9. Such a construction is illustrated by Fig. 3. Conduit 4 communicates through conduit portions 4c and 4b with cylinder 1 into which conduit portion 4b opens at 3b where it is never closed by piston 2. Conduits $14_I$ and $14_{II}$ which respectively contain check-valve 15 and throttling means 16, are then connected with conduit portion 4c. A check-valve 19 is inserted in conduit 4 between conduit portion 4c and slide valve 9. In this embodiment of my invention, time $T_1$ is equal to the whole time interval between the beginning of the downward stroke of piston 2 and the beginning of the next upward stroke.

According to a modification of the pumps illustrated by Figs. 2 and 3, check-valve 19, instead of being located downstream of slide valve 9, is located (Fig. 4) upstream thereof, that is to say in conduit 4 on the right hand side of the slide valve so as to be protected by said slide valve against the pressures existing in cylinder 1 during the compression period.

According to another embodiment of my invention, the operation of the reciprocating control member (slide valve 9) is ensured by a mass of fluid distinct from that placed under pressure in the variable volume chamber of the pump by piston thereof and the action of said first mentioned mass of fluid upon said control member during the delivery stroke of the pump piston either is controlled by said piston, or is ensured by an auxiliary element, for instance the piston of an auxiliary pump, said auxiliary element being driven in such manner that it passes through its upper and lower dead center positions at the same times, respectively, as the pump piston.

Thus, as shown by Fig. 5, the movement of slide valve 9 against the action of spring 18 is obtained by means of a liquid placed under pressure by the upward movement of a piston 20 in a cylinder 21 after this piston 20 has closed the inlet port 22 through which any suitable liquid (which may different from the liquid delivered by the main piston 2) is admitted into said cylinder 21.

Piston 20 is controlled in such manner that it passes through its upper and lower dead center positions at the same times, respectively, as the main piston 2. Preferably, it further stops port 22 at the same time as the main piston stops the port through which conduit 4 opens into the main cylinder 1.

Conduit 14 communicates, in this construction, with cylinder 21. Furthermore, there is provided a discharge conduit 23 leading from cylinder 21, from conduit 14, or from the conduit portion common to branches 14a and 14b. This discharge conduit 23 contains a check-valve 24 held upon its seat by a spring 25 with a force greater than that applied by spring 18. Check-valve 24 opens toward the outside when the projection 12 of the slide valve has come into contact with the bottom 13 of the cylindrical housing 10. The operation of the pump of Fig. 5 is similar to that of the pump shown on Fig. 1.

In the embodiment illustrated by Fig. 6, piston 20a and cylinder 21a, which constitute the auxiliary pump, are coaxial with piston 2 and cylinder 1, and pistons 2 and 20a are rigid with each other and form a single stepped piston. The great advantage of such a construction is that the two pistons are driven in perfect synchronism with each other by a single cam C and that a single return spring 26 is sufficient for both of the pistons.

The pump of Figs. 6 and 7 includes some features which will now be described, it being well understood that they might be applied in connection with other embodiments of the invention, such as those above described.

According to one of these features, the liquid driven back by slide valve 9 during its return downward movement does not flow back to cylinder 21a from which it was delivered under pressure but escapes to the outside of the pump, for instance through a conduit 27 into which projects the throttling member 16, this conduit 27 starting from conduit 14 and a check-valve 28 arranged to prevent back flow of the liquid toward cylinder 21a being interposed between said last mentioned cylinder and conduit 14.

According to another feature illustrated by Fig. 6, the safety effect obtained in the construction of Fig. 5 by means of ball 24 and spring 25 is achieved by slide valve 9 itself. For this purpose, slide valve 9, at the end of its upward stroke, that is to say at a time when port 3 is closed by main piston 2, establishes a communication between conduit 14 and feed conduit 4, as shown by Fig. 7. In this case, the length $a_1$ of the stroke of the slide valve is greater than the value it would have in a pump made according to the above described embodiments (where this length is designated by $a$).

Thus the excess of liquid delivered by auxiliary piston 20a after slide valve 9 has reached its uppermost position (as shown by Fig. 7) is evacuated to the outside of the pump both through conduit 27, provided with the throttling means 16, and through feed conduit 4.

According to still another feature illustrated by Figs. 6 and 7, the abutment which stops slide valve 9 at the end of its stroke (in the upward direction on said figures) produced by the pressure of the liquid from cylinder 21a is unnecessary, slide valve 9 stopping by itself after it has sufficiently opened conduit 4.

Concerning the operation of slide valve 9, in the embodiment of Figs. 6 and 7, as output regulating member, it is the same as in the above described embodiments.

The particular features illustrated by Figs. 5 and 7, may as well be used in connection with pumps made according to other embodiments of the invention and in particular to those illustrated by Figs. 1 to 4.

When the liquid serving to control slide valve 9 is fed from a source which supplies this liquid under a pressure without pulsation, this source being for instance the pump which feeds liquid to cylinder 1, this liquid is controlled, for actuating slide valve 9, and as above indicated, either by the main pump piston 2 or by a part operatively connected with this piston, such a control being for instance analogous to that described in my above mentioned U.S. patent application Ser. No. 684,236, filed on September 16, 1957 and illustrated by Fig. 11 of said application.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A reciprocating action liquid pump which comprises, in combination, a cylinder, a piston having a reciprocating movement in said cylinder to form therewith a variable volume chamber, a feed conduit rigid with said cylinder and opening thereinto to supply liquid into said chamber, means rigid with said cylinder forming a cylindrical housing which extends transversely across said feed conduit, a slide valve reciprocable in said housing, conduit means for conveying liquid to actuate said slide valve, said conduit means opening at one end thereof into one end of said housing, a source of a fluid under pressure distinct from that placed under pressure by said piston, said source being fixed with respect to said cylinder, means movable with respect to said cylinder and operative by said piston for periodically placing said conduit means into communication with said source so that said slide valve is moved in said housing in one direction during every stroke of said piston in said cylinder, resilient means inserted between said slide valve and the means forming said housing for exerting a return force on said slide valve to urge it in the opposed direction with respect to said housing, said slide valve being adapted, when moved in said first direction, to close said feed conduit, and when in a position close to that it occupies at the end of its movement in said opposed direction, to open said feed conduit, said conduit means including two branches, and throttling means for braking the flow of liquid driven back by said slide valve during its movement in said opposed direction.

2. A reciprocating action liquid pump which comprises, in combination, a cylinder, a piston having a reciprocating movement in said cylinder to form therewith a variable volume chamber, a feed conduit rigid with said cylinder and opening thereinto to supply liquid into said chamber, means rigid with said cylinder forming a cylindrical housing which extends transversely across said feed conduit, a slide valve reciprocable in said housing, conduit means for conveying liquid to actuate said slide valve, said conduit means opening into one end of said housing, an auxiliary pump mounted in fixed position with respect to said cylinder for supplying a fluid under pressure including an auxiliary piston, means for operating said auxiliary piston so that it passes through the ends of its reciprocating motion at the same times respectively as said first mentioned piston passes through the ends of its reciprocating motion, said auxiliary pump being in communication with said conduit means so that said slide valve is moved in said housing in one direction during every stroke of said piston in said cylinder, resilient means inserted between said slide valve and the means forming said housing for exerting a return force on said slide valve to urge it in the opposed direction with respect to said housing, said slide valve being adapted, when moved in said first direction, to close said feed conduit, and when in a position close to that it occupies at the end of its movement in said opposed direction, to open said feed conduit, and throttling means for braking the flow of liquid driven back by said slide valve during its movement in said opposed direction.

3. A pump according to claim 2 in which said auxiliary piston is coaxial with said first mentioned piston and said auxiliary pump includes a cylinder coaxial with said first mentioned cylinder.

4. A pump according to claim 2 in which said auxiliary pump includes a cylinder coaxial with said first mentioned cylinder and fixed with respect thereto, said auxiliary piston being rigid with said first mentioned piston, said pump including common driving means for both of said pistons.

5. A pump according to claim 2 in which said slide valve, in the position it occupies at the end of its movement in said first mentioned direction, connects said end of said cylindrical housing with said feed conduit, whereby the excess of fluid supplied by said auxiliary pump can escape through said feed conduit.

6. A reciprocating action liquid pump which comprises, in combination, means forming a variable volume chamber including a fixed part and a moving part having a reciprocating movement with respect to said fixed part, a feed conduit rigid with said fixed part for feeding liquid to said chamber, means rigid with said fixed part forming a housing extending transversely to said feed conduit and intersecting it, a reciprocating slide valve fitting slidably in said housing to control the feed of liquid through said feed conduit, abutment means in said housing for fixing one of the end positions of said slide valve therein so that said slide valve in said end position clears said feed conduit and permits liquid to circulate therethrough whereas, when moved in the direction away from said end position, said slide valve closes said feed conduit, resilient means for constantly urging said slide valve toward said end position in said housing, said housing and said slide valve having cooperating respective portions limiting between them a variable volume space such that increase thereof produces a movement of said slide valve away from said end position thereof, a liquid control conduit having one of its ends in free communication with the portion of said housing that limits said variable volume space, means in communication with the other end of said control conduit for forcing liquid thereinto during every inward stroke of said moving part, check valve means in said control conduit arranged to prevent liquid from flowing therethrough from said first mentioned end to said second mentioned end thereof, discharge conduit means leading out from said portion of said housing that limits said variable volume space, said discharge conduit means having at least a portion thereof distinct from said control conduit, throttling means in said portion of said discharge conduit means to brake the flow of liquid driven back from said space by said slide valve moving under the action of said resilient means, and a liquid delivery conduit in direct communication with said variable volume chamber.

7. A pump according to claim 6 in which said throttling means is adjustable.

8. A reciprocating action liquid pump which comprises, in combination, means forming a variable volume chamber including a fixed part and a moving part having a reciprocating movement with respect to said fixed part, a feed conduit rigid with said fixed part for feeding liquid to said chamber, means rigid with said fixed part forming a housing extending transversely to said feed conduit and intersecting it, a reciprocating slide valve fitting slidably in said housing to control the feed of liquid through said feed conduit, abutment means in said housing for fixing one of the end positions of said slide valve therein so that said slide valve in said end position clears said feed conduit and permits liquid to circulate therethrough whereas, when moved in the direction away from said end position, said slide valve closes said feed conduit, resilient means for constantly urging said slide valve toward said end position in said housing, said housing and said slide valve having cooperating respective portions limiting between them a variable volume space such that increase thereof produces a movement of said slide valve away from said end position thereof, a liquid control conduit having one of its ends in free communication with the portion of said housing that limits said variable volume space, and its other end in free communication with said variable volume chamber so that liquid is forced from said chamber into said control conduit during every inward stroke of said moving part, check valve means in said control conduit arranged to prevent liquid from flowing therethrough from said first mentioned end to said second mentioned end thereof, discharge conduit means leading out from said portion of said housing that limits said variable volume space, said discharge conduit means having at least a portion thereof distinct from said control conduit, throttling means in said portion of said discharge conduit means to brake the flow of liquid driven back from said space by said slide valve moving under the action of said resilient means, and a liquid delivery conduit in direct communication with said variable volume chamber.

9. A reciprocating action liquid pump which comprises, in combination, a cylinder, a piston having a reciprocating movement in said cylinder to form therewith a variable volume chamber, a feed conduit rigid with said cylinder and opening thereinto to supply liquid into said chamber, means rigid with said cylinder forming a cylindrical housing which extends transversely to said feed conduit and intersects it, a reciprocating slide valve fitting slidably in said housing to control the feed of liquid through said feed conduit, abutment means in said housing for fixing one of the end positions of said slide valve therein so that said slide valve in said end position clears said feed conduit and permits liquid to circulate therethrough whereas, when moved in the direction away from said end position, said slide valve closes said feed conduit, resilient means for constantly urging said slide valve toward said end position in said housing, said housing and said slide valve having cooperating respective portions limiting between them a variable volume space such that increase thereof produces a movement of said slide valve away from said end position thereof, a liquid control conduit having one of its ends in free communication with the portion of said housing that limits said variable volume space and its other end in communication with said variable volume chamber so that liquid is forced from said chamber into said control conduit during every inward stroke of said piston, check valve means in said control conduit arranged to prevent liquid from flowing therethrough from said first mentioned end to said second mentioned end thereof, discharge conduit means leading out from said portion of said housing that limits said variable volume space, said discharge conduit means having at least a portion thereof distinct from said control conduit, throttling means in said portion of said discharge conduit means to brake the flow of liquid driven back from said space by said slide valve moving under the action of said resilient means, and a liquid delivery conduit in direct communication with said variable volume chamber of said cylinder.

10. A pump according to claim 9 in which said second mentioned end of said control conduit opens into the portion of said cylinder forming said variable volume chamber at a point thereof outside of the portion of the inner wall of said cylinder that is covered at some time by said piston.

11. A pump according to claim 9 in which said second mentioned end of said control conduit opens into the portion of said cylinder forming said variable volume chamber at a point thereof outside of the portion of the inner wall of said cylinder that is covered at some time by said piston, said discharge conduit opening into said cylinder at said point thereof.

12. A pump according to claim 9 in which said second mentioned end of said control conduit opens into the portion of said cylinder forming said variable volume chamber at a point thereof outside of the portion of the inner wall of said cylinder that is covered at some time by said piston, said discharge conduit opening into said feed conduit in the portion thereof located between said cylinder and said slide valve housing.

13. A pump according to claim 9 in which said second mentioned end of said control conduit opens into the portion of said cylinder forming said variable volume chamber at a point thereof outside of the portion of the inner wall of said cylinder that is covered at some time by said piston, both said discharge conduit and said feed conduit opening into said cylinder at said point thereof, said pump further including a check valve in said feed conduit opening toward said cylinder.

14. A pump according to claim 13 in which said last mentioned check valve is located in the portion of said feed conduit between said cylinder and said slide valve housing.

15. A pump according to claim 13 in which said last mentioned check valve is located in the portion of said feed conduit upstream of said slide valve housing.

References Cited in the file of this patent
UNITED STATES PATENTS

| | | |
|---|---|---|
| 2,172,751 | Heindrich | Sept. 12, 1939 |
| 2,575,677 | Neu | Nov. 20, 1951 |

FOREIGN PATENTS

| | | |
|---|---|---|
| 402,603 | Great Britain | Dec. 7, 1933 |